United States Patent
Isson et al.

(10) Patent No.: US 7,103,015 B1
(45) Date of Patent: Sep. 5, 2006

(54) DSL TRANSMISSION SYSTEM WITH MEANS FOR ENSURING LOCAL ECHO ORTHOGONALITY

(75) Inventors: Olivier Isson, La Tronche (FR); Tomas Nordstrom, Lulea (SE)

(73) Assignees: STMicroelectronics S.A., Gentilly (FR); Telia AB, Farsta (SE)

( * ) Notice: Subject to any disclaimer, the term of this patent is extended or adjusted under 35 U.S.C. 154(b) by 0 days.

(21) Appl. No.: 09/517,417

(22) Filed: Mar. 2, 2000

(30) Foreign Application Priority Data

Mar. 5, 1999 (EP) .................................. 99410014

(51) Int. Cl.
*H04B 3/20* (2006.01)

(52) U.S. Cl. ...................................................... 370/290

(58) Field of Classification Search ................ 370/276, 370/286–292; 379/3; 455/570; 375/148
See application file for complete search history.

(56) References Cited

U.S. PATENT DOCUMENTS

| | | | | |
|---|---|---|---|---|
| 5,084,865 A | * | 1/1992 | Koike | 370/289 |
| 5,317,596 A | | 5/1994 | Ho et al. | 375/14 |
| 5,521,908 A | * | 5/1996 | Younce et al. | 370/286 |
| 5,577,116 A | * | 11/1996 | Townsend et al. | 379/406.12 |
| 5,623,513 A | * | 4/1997 | Chow et al. | 375/219 |
| 5,668,802 A | * | 9/1997 | Chalmers et al. | 370/276 |
| 5,751,716 A | * | 5/1998 | Tzannes et al. | 370/468 |
| 6,072,782 A | * | 6/2000 | Wu | 370/286 |
| 6,377,683 B1 | * | 4/2002 | Dobson et al. | 379/406.12 |
| 6,535,550 B1 | * | 3/2003 | Cole | 375/222 |
| 6,546,055 B1 | * | 4/2003 | Schmidl et al. | 375/244 |
| 6,845,125 B1 | * | 1/2005 | Sasaki et al. | 375/219 |

FOREIGN PATENT DOCUMENTS

WO    WO 97/06619    2/1997

OTHER PUBLICATIONS

European Search Report from European Application 99410014.7, filed Mar. 5, 1999.

* cited by examiner

*Primary Examiner*—Dmitry Levitan
(74) *Attorney, Agent, or Firm*—Lisa K. Jorgenson; James H. Morris; Wolf, Greenfield & Sacks, P.C.

(57) ABSTRACT

A digital subscriber line transmission system comprising an IFFT circuit generating successive outgoing time domain symbols on a subscriber line from respective groups of digital frequency domain coefficients; an FFT circuit generating groups of digital frequency domain coefficients from respective incoming time domain symbols received on the subscriber line, a current incoming symbol being delayed with respect to a current outgoing symbol by a predetermined time interval; and circuitry for, during an end portion of a current incoming symbol, subtracting from the signal received on the subscriber line an estimated echo obtained by a filter from a signal portion following the end of the current outgoing symbol, and adding thereto, through said filter, a beginning portion of the current outgoing symbol, wherein said portions have a duration at least equal to said predetermined time interval.

23 Claims, 4 Drawing Sheets

DSL TRANSMISSION SYSTEM WITH MEANS FOR ENSURING LOCAL ECHO ORTHOGONALITY

BACKGROUND OF THE INVENTION

1. Field of the Invention

The present invention relates to digital subscriber line (DSL) transmission systems which allow high speed communication on twisted pair telephone lines, in particular. The invention relates more specifically to a solution for maintaining orthogonality of a local echo.

2. Discussion of the Related Art

Figure 1:
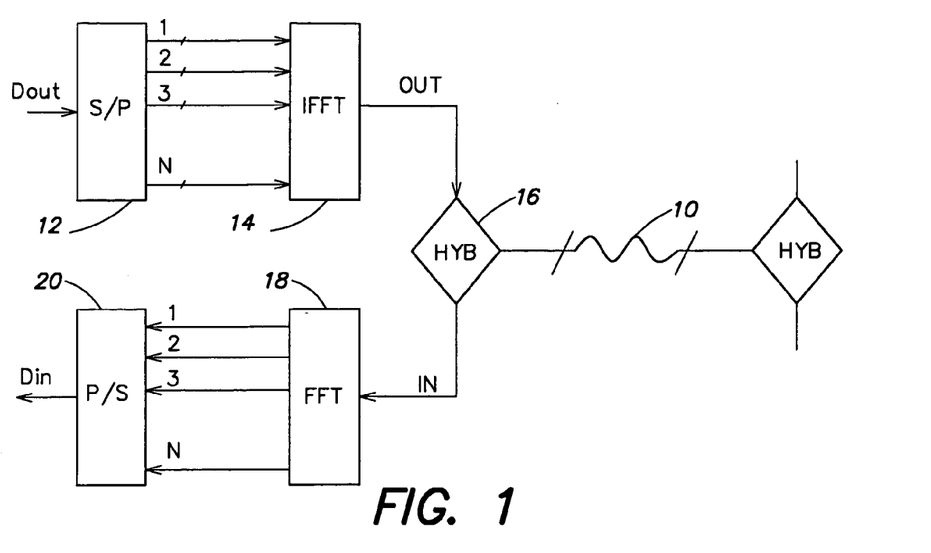
FIG. 1, previously described, schematically shows a DSL transmission system.

FIG. 1 very schematically shows a DSL transmission system at one end of a telephone line 10. A serial stream of outgoing digital data Dout is provided to a serial-to-parallel converter 12 which extracts N multibit values, each corresponding to a complex frequency domain coefficient. These frequency domain coefficients are provided to an inverse fast Fourier transform (IFFT) circuit 14 which generates, for each set of N coefficients, a time domain symbol. A symbol is thus the sum of N sinusoidal subcarriers of different frequencies, the amplitude and phase of each subcarrier being determined by the corresponding frequency domain coefficient received by the IFFT circuit.

Each symbol is transferred onto telephone line 10 through a hybrid line interface 16. Line interface 16 also receives incoming symbols from line 10. These incoming symbols are provided to a fast Fourier transform (FFT) circuit 18 which extracts the N frequency domain coefficients of each received symbol. These frequency domain coefficients are arranged into an incoming serial data stream Din through a parallel-to-serial converter 20.

A similar structure is provided at the other end of line 10.

The illustrated serial-parallel conversions are for clarification purposes only, since the FFT and IFFT circuits operate, in practice, directly on the serial streams in a pipeline manner.

Figure 2:
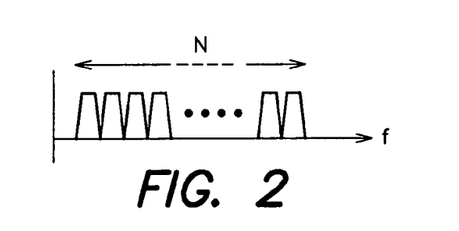
FIG. 2 illustrates a subdivision of the telephone line bandwidth in several channels used in DSL systems.

FIG. 2 illustrates the spectrum of the signals conveyed on line 10 in such a system. The bandwidth of the telephone line is subdivided in N channels, each corresponding to one frequency domain coefficient as processed by the IFFT and FFT circuits. There are for example N=2048 channels, each having a bandwidth of 5 kHz. The first frequency domain coefficients may be 11 bits wide and thus correspond to 2048 different amplitudes/phases in the time domain. Because of the attenuation undergone by the higher frequencies on the telephone line, the last frequency domain coefficients may only be two bits wide.

A gap shown in FIG. 2 at the beginning of the spectrum is reserved for "plain old telephone services" (POTS).

Figure 3:
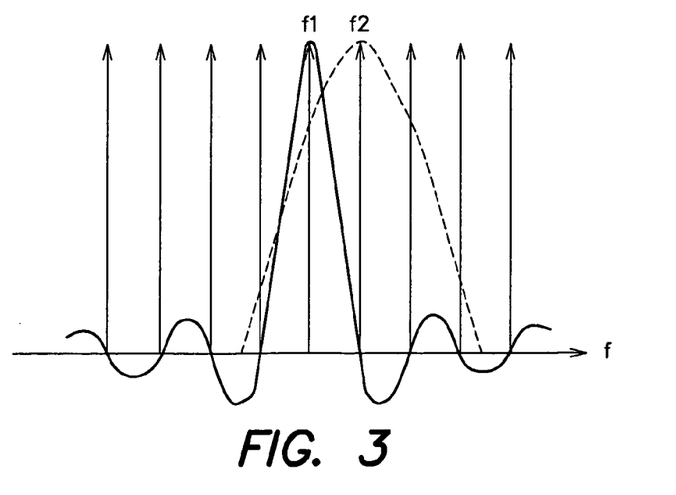
FIG. 3 illustrates the spectrum of a sampled subcarrier and of a near-end echo.

FIG. 3 shows the spectrum of one subcarrier f1 conveyed in a symbol. This spectrum is not a discrete value at f1 because the symbol is sampled in a window. The power spectral density thus has a sin(x)/x (sinc) function shape. To avoid the interference of the lobes of this spectrum with nearby channels, the subcarriers are chosen to be "orthogonal". This means, as shown, that the distance between subcarriers is chosen so that each subcarrier is at a zero crossing of the sinc functions. The sinc functions only depend on the window width, which is constant, and thus have a constant pseudo period and all have zero values at the same frequencies.

In order to avoid near-end and local echo problems, the channels are often used only for unidirectional communication, whereby, in theory, near-end echoes of outgoing symbols occur in channels not used for the incoming symbols. In practice, there is a main difficulty in implementing this solution, as explained below.

Figure 4:
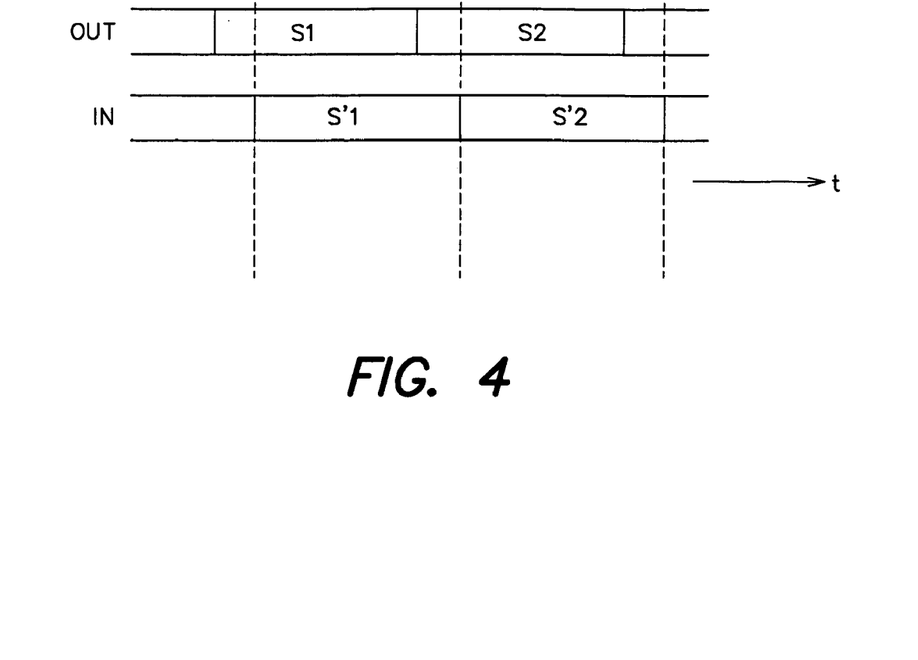
FIG. 4 illustrates bare incoming and outgoing symbols on a telephone line.

FIG. 4 shows a stream of outgoing symbols S1, S2 . . . on line 10, and a stream of incoming symbols S'1, S'2 . . . For clarity reasons, it is supposed that the incoming symbols convey only one subcarrier f1 and the outgoing symbols convey only one subcarrier f2, the subcarriers f1 and f2 being adjacent. As shown, the incoming and outgoing symbols are not synchronized, the phase-shift depending essentially on the characteristics of the telephone line 10. The FFT circuit 18 synchronizes its sampling on the incoming symbols, as shown by dotted lines. While each incoming symbol is sampled by FFT circuit 18, the echo of the outgoing signal is also sampled.

Due to the delay between the incoming and outgoing symbols, the transitions between the outgoing symbols will be sampled in the echoes. Such transitions are discontinuities which have a wide spectrum in the frequency domain. This is shown in FIG. 3 by dotted lines for subcarrier f2. This wide spectrum affects all the nearby channels.

Figure 5:
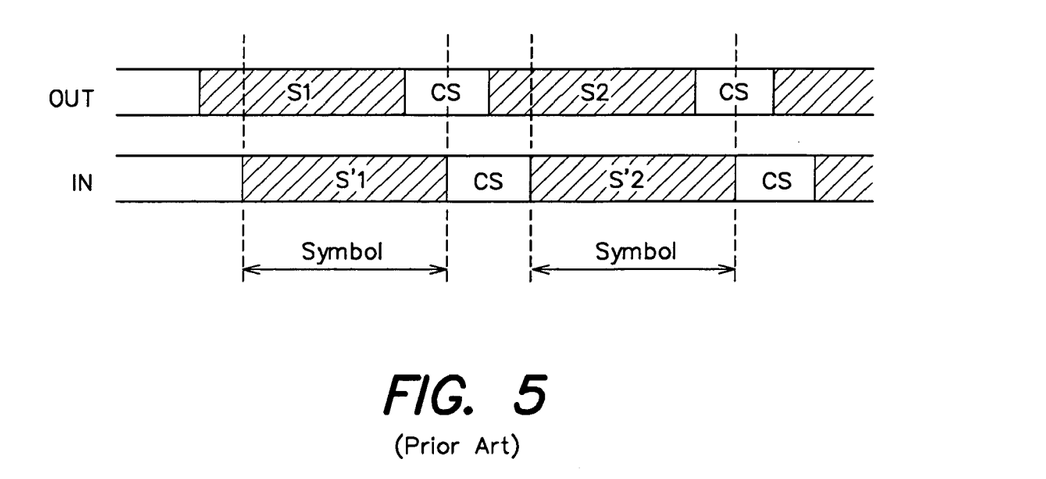
FIG. 5 illustrates incoming and outgoing symbols with cyclic suffixes on a telephone line.

FIG. 5 illustrates a conventional solution, disclosed in PCT patent application WO 97/06619, for avoiding this problem. Each symbol is extended by a cyclic suffix CS which is longer than the delay between the incoming and outgoing symbols. This cyclic suffix is a simple copy of the first portion of the corresponding symbol. (The cyclic suffix mentioned here should not be mistaken with a cyclic prefix conventionally used for other purposes. Such a cyclic prefix, not shown for clarity purposes, corresponds to an end-portion of each symbol placed in front of the symbol.)

As shown, the incoming symbols are sampled outside the cyclic suffixes CS. In this manner, the system samples the echo of a portion of each outgoing symbol followed by a portion of its cyclic suffix CS, and does not see a transition between two symbols. As a consequence, the sampled echo remains orthogonal, i.e. each subcarrier in the sampled echo has the sinc-shaped spectrum shown in continuous line in FIG. 3 and not the wide spectrum shown in dotted line.

A drawback of this solution is that it needs the transmission of a cyclic suffix for each symbol, which suffix is a duplication of a portion of the corresponding symbol, often 5% of the symbol. This inevitably reduces the transmission throughput of the system by at least 5%.

It could be devised to cancel the local echo in order to omit the use of a cyclic suffix. Moreover, a local echo canceling would allow each channel to be used in full duplex mode, i.e. in both transmission directions.

Theory on how to design adaptive filters, such as Finite Impulse Response filters (FIR) used in echo-cancellers, is provided in the manual "Adaptive Filter Theory" by S. Haykin, Prentice-Hall, New Jersey, 1991 which is incorporated herein by reference.

The use of an echo-canceller would dramatically increase the throughput of the system but the hardware requirements may increase more than the throughput gain obtained. Indeed, an adaptive filter used for echo-cancellation in a DSL transmission system should be designed to store all the time domain samples of a currently processed symbol and for adaptively calculating weighting coefficients for a large number of samples, reaching 1000 if the symbol has more than 1000 samples. The complexity of the algorithm is proportional to the product of the size of the filter by the number of weighting coefficients to calculate, since all the weighting coefficients are recalculated each time a new sample is received. The number of samples of a symbol is equal to double the order of the FFT, i.e. the number of channels used.

SUMMARY OF THE INVENTION

An object of the present invention is to provide a DSL transmission system of particularly simple structure avoiding the use of cyclic suffixes for making the local echo orthogonal.

This and other objects are achieved by a digital subscriber line transmission system comprising an inverse fast Fourier transform circuit generating successive outgoing time domain symbols on a subscriber line from respective groups of digital frequency domain coefficients; a fast Fourier transform circuit generating groups of digital frequency domain coefficients from respective incoming time domain symbols received on the subscriber line, a current incoming symbol being delayed with respect to a current outgoing symbol by a predetermined time interval; and means for, during an end portion of a current incoming symbol, subtracting from the signal received on the subscriber line an estimated echo obtained by a filter from a signal portion following the end of the current outgoing symbol, and adding thereto, through said filter, a beginning portion of the current outgoing symbol, wherein said portions have a duration at least equal to said predetermined time interval.

According to an embodiment of the invention, the filter is a finite impulse response filter having a size adapted for processing samples of the symbols only during said predetermined time interval, comprising means for continuously calculating filter coefficients from the signals received and transmitted on the subscriber line.

According to an embodiment of the invention, the predetermined time interval is equal to a maximum delay between the incoming and outgoing symbols.

According to an embodiment of the invention, the system comprises a FIFO memory receiving the outgoing symbols; a subtractor arranged for subtracting the outgoing symbols from the output of the delay line; said filter receiving the output of the subtractor and enabled only during said time interval from the end of each outgoing symbol; and an adder receiving the output of the filter and said incoming symbols.

According to an embodiment of the invention, the FIFO memory has a size for storing only the beginning portion of each outgoing symbol, is write-enabled during said time interval from the beginning of each outgoing symbol, and read-enabled during said time interval from the end of each outgoing symbol.

These objects, features, aspects and advantages of the invention will become apparent from the following detailed description of embodiments, given by way of illustration and not of limitation with reference to the accompanying drawings.

DETAILED DESCRIPTION

In order to make a local echo orthogonal without the use of a cyclic suffix for each symbol, the present invention replaces, in the echo signal, the contribution of the beginning portion of each symbol by the contribution of the beginning portion of the preceding symbol, which is equivalent to using cyclic suffixes without the cyclic suffixes being present in the signal.

Figure 6:
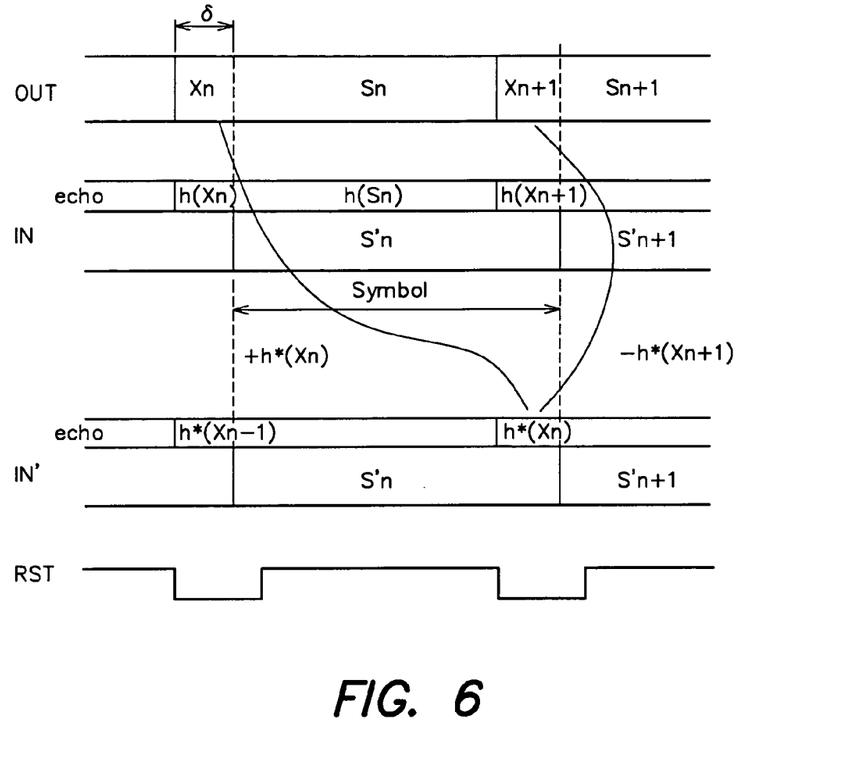
FIG. 6 illustrates the principle of the present invention with the aid of incoming and outgoing symbols in the time domain.

FIG. 6 shows successive incoming and outgoing symbols in the time domain, such as they appear at the input IN of FFT circuit 18 and at the output OUT of IFFT circuit 14 (FIG. 1). The incoming symbols are delayed by a time interval $\delta$ and they are illustrated with the local echo h(.) generated by the outgoing symbols.

As shown, a current incoming symbol S'n overlaps a large end portion of the echo h(Sn) of a current outgoing symbol Sn and a small beginning portion h(Xn+1) of the echo of the next outgoing symbol Sn+1.

One purpose of the invention is to replace the echo portion h(Xn+1) by a portion of same length h(Xn) of the beginning of the echo of symbol Sn.

In practice, the echo portion h(Xn+1) is subtracted from the end portion of the currently received symbol S'n while the echo portion h(Xn) is added thereto. Thus, a new input signal IN' is generated in which the incoming symbol S'n coincides with echo portions belonging to the same outgoing symbol, whereby the orthogonality between sub-carriers of received symbol S'n and sub-carriers of echoes of outgoing symbols is preserved.

Since the echo of the outgoing symbols is unknown, the transfer function h of the echo generation should be estimated, like in a conventional echo-canceller. The estimated transfer function is designated h*. As symbolized in FIG. 6, this estimated transfer function h* is used for calculating, from the outgoing signal, the echo portions to add to, and subtract from, the incoming signal.

In contrast to a conventional echo-canceller, the echoes are calculated according to the invention only for small portions of each symbol, not exceeding 5%. As a consequence, the size of the FIR filter to use is chosen to store only 5% of the samples of each symbol. The number of weighting coefficients to calculate does not exceed the size of the filter. For example, if the symbols to process have 4096 samples, the filter will have a size of 200, whereby the number of weighting coefficients to calculate is also 200. The complexity of the calculation algorithm has a factor $200^2=40,000$, instead of the conventional factor of $1000\times 4096=4,096,000$.

Of course, the length of the above echo portions, thus the size of the filter, should at least be equal to the delay $\delta$ between the incoming and outgoing symbols. Since this delay $\delta$ depends on various parameters, such as the subscriber line length, the length of the filter is chosen equal to the maximum delay, which is in fact the length conventionally chosen for the cyclic suffixes. However, if the delay $\delta$ is shorter than the maximum value, it is possible to correspondingly reduce the number of weighting coefficients to calculate.

Figure 7:
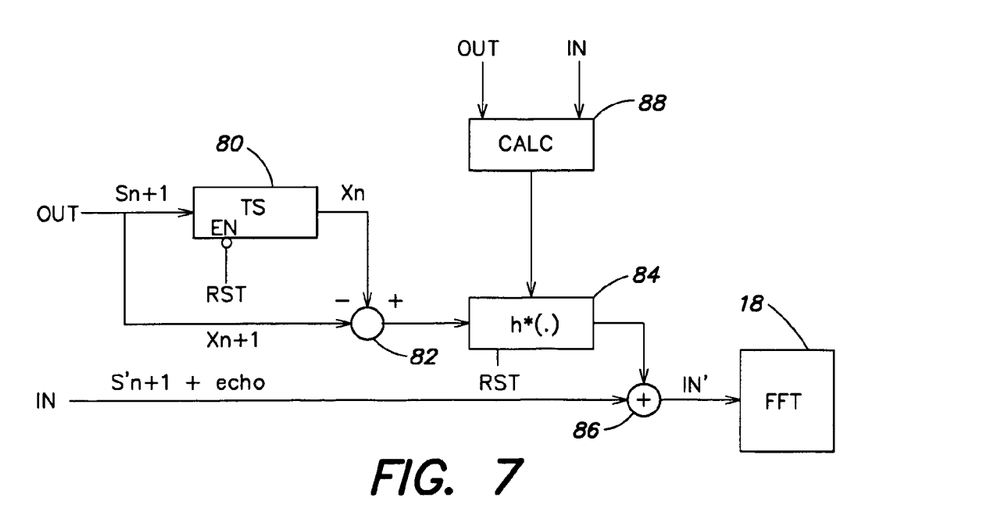
FIG. 7 schematically shows an embodiment of the circuit according to the invention implementing the principle of FIG. 6.

FIG. 7 schematically shows an embodiment of a circuit implementing the principle described in relation with FIG. 6. The outgoing time domain symbols S, i.e. the output OUT of IFFT circuit 14 of FIG. 1, are provided to a digital delay line 80 which introduces a delay of one symbol. The outgoing symbols S are also subtracted from the output of the delay line 80 by a subtractor 82. Subtractor 82 thus provides the difference between an outgoing symbol Sn and the next outgoing symbol Sn+1. This difference is provided to an FIR filter 84 which is adjusted to have the estimated transfer function h* of the local echo generation.

As previously mentioned, filter 84 is designed to operate only on a number of samples corresponding to delay δ or the maximum value thereof. When filter 84 does not receive samples for which an echo should be estimated, it is held at a reset state so that it provides value zero. An exemplary reset signal RST is illustrated in FIG. 6. It is inactive from the beginning of each outgoing symbol for a duration corresponding to the maximum value of delay δ.

In fact, with the structure of FIG. 7, filter 84 estimates the echo of the difference of two symbol portions (the subtraction is achieved by element 82 before the filter) which, since the filter is linear, is equivalent to the subtraction of the echoes of the two portions.

The output of filter 84 is provided to an adder 86 which also receives the incoming symbols S' affected by the non-orthogonal echo. Adder 86 provides the input signal IN' of FFT circuit 18, which signal has the desired orthogonal echo.

The necessary weighting coefficients for filter 84 are provided by a calculating element 88 which implements a conventional echo-canceller algorithm using the input and output signals IN and OUT. Since this calculation algorithm does not depend on the output of the filter, the calculation may continue even during the periods when filter 84 is inactive. The weighting coefficients being evaluated by successive iterations, this permanent operation of the algorithm will allow a faster convergence of the weighting coefficients, especially at start-up of the system.

Since filter 84 is operative only during short time periods, at the beginning of each outgoing symbol, it is not necessary to store a whole symbol in delay line 80. Delay line 80 may be chosen of a size adapted to storing only the necessary portion of each symbol. In this case, delay line 80 is enabled only during the periods when the reset signal RST of the filter is inactive.

For sake of clarity, conventional cyclic prefixes were not considered in the above description. Such prefixes are however used most of the time.

Figure 8:
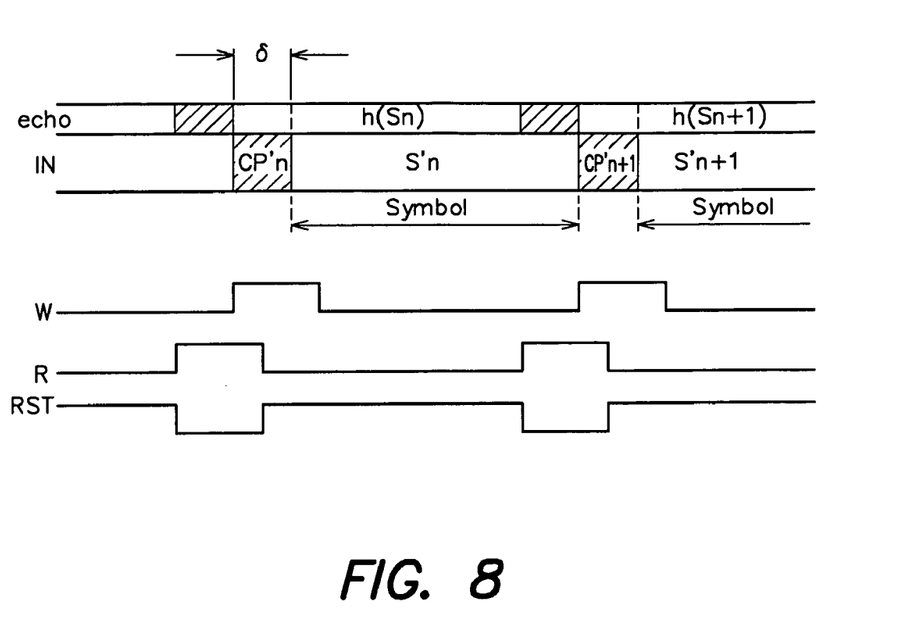
FIG. 8 illustrates incoming symbols with cyclic prefixes on a telephone line.

In FIG. 8, cyclic prefixes CP are added to the symbols. This figure shows the incoming signal IN affected by the echo of the outgoing signal. A current incoming symbol S'n overlaps the echo of the current outgoing symbol Sn and of the prefix of the next outgoing symbol Sn+1. In this case, it is the echo of the prefix of the next outgoing symbol that is replaced by the echo of the beginning portion of the current outgoing symbol.

In fact, as a general rule for signals with or without cyclic prefixes, the echo portion coming after the echo of an outgoing symbol is replaced by the echo of the beginning portion of the outgoing symbol.

The delay line 80 is in fact a FIFO memory which is write enabled at least for time δ from the beginning of each outgoing symbol and read enabled when filter 84 is operative, i.e. for at least time δ from the end of each outgoing symbol. Corresponding write, read, and reset signals W, R, RST are shown in FIG. 8.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A digital subscriber line transmission system comprising:
   an inverse fast Fourier transform circuit generating successive outgoing time domain symbols without cyclic suffixes on a subscriber line from respective groups of digital frequency domain coefficients;
   a fast Fourier transform circuit generating groups of digital frequency domain coefficients from respective incoming time domain symbols received on the subscriber line, a current incoming symbol being delayed with respect to a current outgoing symbol by a predetermined time interval; and
   a processing circuit for making sub-carriers of a local echo of the outgoing time domain symbols orthogonal to sub-carriers of the incoming time domain symbols, said processing circuit comprising means for adding to said incoming time domain symbols an estimated echo obtained by filtering the difference between a signal portion following the end of the current outgoing symbol and a beginning portion of the current outgoing symbol, wherein said portions have a duration at least equal to said predetermined time interval.

2. The system of claim 1, wherein the filter is a finite impulse response filter having a size adapted for processing samples of the symbols only during said predetermined time interval, comprising means for continuously calculating filter coefficients from the signals received and transmitted on the subscriber line.

3. The system of claim 1, wherein the predetermined time interval is equal to a maximum delay between the incoming and outgoing symbols.

4. The system of claim 1, further comprising:
   a FIFO memory receiving the outgoing symbols;
   a subtractor arranged for subtracting the outgoing symbols from the output of the FIFO memory;
   said filter receiving the output of the subtractor and enabled only during said predetermined time interval from the end of each outgoing symbol; and
   an adder receiving the output of the filter and said incoming symbols.

5. The system of claim 4, wherein the FIFO memory has a size for storing only the beginning portion of each outgoing symbol, is write-enabled during said predetermined time interval from the beginning of each outgoing symbol, and read-enabled during said predetermined time interval from the end of each outgoing symbol.

6. In a digital subscriber line (DSL) transmission system in which at least a first outgoing symbol and a second outgoing symbol are successively transmitted, at least one incoming symbol is received, and an echo of the first outgoing symbol and an echo of the second outgoing symbol are successively received as part of an echo signal, a method comprising an act of:
   (A) making sub-carriers of the echo signal orthogonal to sub-carriers of the at least one incoming symbol by replacing a first portion of the echo of the second outgoing symbol with the an estimation of a first portion of the echo of the first outgoing symbol.

7. The method of claim 6 wherein the first portion of the echo of the second outgoing signal and the first portion of the echo of the first outgoing symbol have a same length that is less than or equal to a maximum delay between transmitted and received symbols.

8. The method of claim 7 wherein:
each of the first outgoing symbol and the second outgoing symbol have a same total length; and
the length of the first portion of the echo of the second outgoing symbol and the first portion of the echo of the first outgoing symbol does not exceed 5% of the total length.

9. The method of claim 6 wherein the act A) comprises acts of:
A1) obtaining a difference between a first portion of the first outgoing symbol and a first portion of the second outgoing symbol;
A2) applying an estimated transfer function of echo generation to the difference to generate an echo compensation signal; and
A3) adding the echo compensation signal to at least the first portion of the echo of the second outgoing symbol.

10. The method of claim 9, wherein the act A1) includes an act of:
applying a one symbol delay to at least the first and second outgoing symbols.

11. The method of claim 10, wherein the act A2) includes an act of:
passing the difference through a finite impulse response filter having the estimated transfer function of the echo generation.

12. The method of claim 10, wherein the act A2) includes an act of:
calculating the estimated transfer function based at least on a plurality of outgoing symbols and a plurality of incoming symbols.

13. The method of claim 12, wherein each outgoing symbol and each incoming symbol has a total symbol length, and wherein the act of calculating the estimated transfer function includes an act of:
calculating the estimated transfer function based only on a portion of the total symbol length.

14. The method of claim 13, wherein the act of calculating the estimated transfer function includes an act of calculating the estimated transfer function based on approximately 5% of a total number of samples of each symbol.

15. In a digital subscriber line (DSL) transmission system in which at least a first outgoing symbol and a second outgoing symbol are successively transmitted, at least one incoming symbol is received, and an echo of the first outgoing symbol and an echo of the second outgoing signal are successively received as part of an echo signal, an apparatus comprising:
a circuit to make sub-carriers of the echo signal orthogonal to sub-carriers of the at least one incoming symbol, the circuit operative to replace a first portion of the echo of the second outgoing symbol with an estimation of a first portion of the echo of the first outgoing symbol.

16. The apparatus of claim 15, wherein the first portion of the echo of the second outgoing signal and the first portion of the echo of the first outgoing symbol have a same length that is less than or equal to a maximum delay between transmitted and received symbols.

17. The apparatus of claim 16, wherein:
the first outgoing symbol and the second outgoing symbol have a same total length; and
the length of the first portion of the echo of the second outgoing signal and the first portion of the echo of the first outgoing symbol does not exceed 5% of the total length.

18. The apparatus of claim 15, wherein the circuit is configured to:
obtain a difference between a first portion of the first outgoing symbol and a first portion of the second outgoing symbol;
apply an estimated transfer function of echo generation to the difference to generate an echo compensation signal; and
add the echo compensation signal to at least the first portion of the echo of the second outgoing symbol.

19. The apparatus of claim 18, wherein the circuit includes at least one delay unit configured to apply a one symbol delay to at least the first and second outgoing symbols.

20. The apparatus of claim 19, wherein the circuit further includes a finite impulse response filter, coupled to the at least one delay unit and having the estimated transfer function of the echo generation, to process the difference.

21. The apparatus of claim 20, wherein the circuit further includes at least one calculating unit configured to calculate the estimated transfer function based at least on a plurality of outgoing symbols and a plurality of incoming symbols.

22. The apparatus of claim 21, wherein each outgoing symbol and each incoming symbol has a total symbol length, and wherein the at least one calculating unit is configured to calculate the estimated transfer function based only on a portion of the total symbol length.

23. The apparatus of claim 22, wherein the at least one calculating unit is configured to calculate the estimated transfer function based on approximately 5% of a total number of samples of each symbol.

* * * * *

UNITED STATES PATENT AND TRADEMARK OFFICE
CERTIFICATE OF CORRECTION

PATENT NO.       : 7,103,015 B1
APPLICATION NO.  : 09/517417
DATED            : September 5, 2006
INVENTOR(S)      : Olivier Isson and Tomas Nordström It is certified that error appears in the above-identified patent and that said Letters Patent is hereby corrected as shown below:

On the title page item (75) should read:
(75) Inventors: Olivier Isson, La Tronche (FR); Tomas Nordström, Lulea (SE)

Claims 2-6, 8, and 15 should read:
   2.   The system of claim 1, further comprising:
   a finite impulse response filter having a size adapted for processing samples of the outgoing time domain symbols only during said predetermined time interval, comprising means for continuously calculating filter coefficients from the outgoing time domain signals received and transmitted on the subscriber line.

3.   The system of claim 1, wherein the predetermined time interval is equal to a maximum delay between the incoming and outgoing time domain symbols.

4.   The system of claim 1, further comprising:
   a FIFO memory receiving the outgoing time domain symbols;
   a subtractor arranged for subtracting the outgoing time domain symbols from output of the FIFO memory;
   a filter receiving output of the subtractor and enabled only during said predetermined time interval from an end of each outgoing time domain symbol; and
   an adder receiving the output of the filter and said incoming time domain symbols.

5.   The system of claim 4, wherein the FIFO memory has a size for storing only a beginning portion of each outgoing time domain symbol, is write-enabled during said predetermined time interval from the beginning of each outgoing time domain symbol, and read-enabled during said predetermined time interval from the end of each outgoing time domain symbol.

6.   In a digital subscriber line (DSL) transmission system in which at least a first outgoing symbol and a second outgoing symbol are successively transmitted, at least one incoming symbol is received, and an echo of the first outgoing symbol and an echo of the second outgoing symbol are successively received as part of an echo signal, a method comprising an act of:
   (A)   making sub-carriers of a first portion of the echo signal, the first portion being less than all of the echo signal, orthogonal to sub-carriers of the at least one incoming symbol by replacing a the first portion of the echo of the second outgoing symbol with an estimation of a first portion of the echo of the first outgoing symbol.

UNITED STATES PATENT AND TRADEMARK OFFICE
CERTIFICATE OF CORRECTION

PATENT NO. : 7,103,015 B1
APPLICATION NO. : 09/517417
DATED : September 5, 2006
INVENTOR(S) : Olivier Isson and Tomas Nordström It is certified that error appears in the above-identified patent and that said Letters Patent is hereby corrected as shown below:

8.    The method of claim 7 wherein:
the first outgoing symbol and the second outgoing symbol have a same total length; and the length of the first portion of the echo of the second outgoing symbol and the first portion of the echo of the first outgoing symbol does not exceed 5% of the total length.

15.    In a digital subscriber line (DSL) transmission system in which at least a first outgoing symbol and a second outgoing symbol are successively transmitted, at least one incoming symbol is received, and an echo of the first outgoing symbol and an echo of the second outgoing signal are successively received as part of an echo signal, an apparatus comprising:
a circuit to make sub-carriers of a first portion of the echo signal, the first portion being less than all of the echo signal, orthogonal to sub-carriers of the at least one incoming symbol, the circuit operative to replace a the first portion of the echo of the second outgoing–symbol with an estimation of a first portion of the echo of the first outgoing symbol.

Signed and Sealed this

Twelfth Day of December, 2006

JON W. DUDAS
*Director of the United States Patent and Trademark Office*